United States Patent
Kuo et al.

(10) Patent No.: US 10,609,319 B2
(45) Date of Patent: Mar. 31, 2020

(54) IMAGE SENSOR CAPABLE OF AVERAGING PIXEL DATA

(71) Applicant: PixArt Imaging Inc., Hsin-Chu County (TW)

(72) Inventors: Chia-Chi Kuo, Hsin-Chu County (TW); Jui-Te Chiu, Hsin-Chu County (TW); Han-Chi Liu, Hsin-Chu County (TW); Peng-Sheng Chen, Hsin-Chu County (TW); Yi-Cheng Chiu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 113 days.

(21) Appl. No.: 15/830,754

(22) Filed: Dec. 4, 2017

(65) Prior Publication Data
US 2019/0174084 A1   Jun. 6, 2019

(51) Int. Cl.
| | |
|---|---|
| *H04N 5/378* | (2011.01) |
| *H04N 5/369* | (2011.01) |
| *H04N 5/3745* | (2011.01) |
| *H04N 5/374* | (2011.01) |
| *H04N 5/347* | (2011.01) |

(52) U.S. Cl.
CPC ............. *H04N 5/378* (2013.01); *H04N 5/347* (2013.01); *H04N 5/3696* (2013.01); *H04N 5/3698* (2013.01); *H04N 5/374* (2013.01); *H04N 5/37455* (2013.01)

(58) Field of Classification Search
CPC ........ H04N 5/378; H04N 5/347; H04N 5/374; H04N 5/3698; H04N 5/37455; H04N 5/3696
See application file for complete search history.

(56) References Cited

U.S. PATENT DOCUMENTS

| | | | |
|---|---|---|---|
| 2005/0133687 A1* | 6/2005 | Bock | H01L 27/14609 250/208.1 |
| 2012/0006972 A1* | 1/2012 | Yoo | H04N 5/347 250/208.1 |
| 2014/0354866 A1* | 12/2014 | Yoo | H04N 5/347 348/308 |

* cited by examiner

*Primary Examiner* — Mekonnen D Dagnew
(74) *Attorney, Agent, or Firm* — Hauptman Ham, LLP (57) ABSTRACT

An image sensor including a first pixel circuit, a second pixel circuit, a first readout line, a second readout line, a first readout circuit, a second readout circuit and an average switch is provided. The first and second pixel circuits are in two columns of a pixel array. The first readout line transmits pixel data of the first pixel circuit to the first readout circuit. The second readout line transmits pixel data of the second pixel circuit to the second readout circuit. The average switch is arranged between the first and second readout lines and used to electrically connect the first and second readout lines in an average mode to average the pixel data on the first and second readout lines.

10 Claims, 8 Drawing Sheets

IMAGE SENSOR CAPABLE OF AVERAGING PIXEL DATA

BACKGROUND

1. Field of the Disclosure

This disclosure generally relates to an image sensor, more particularly, to an image sensor capable of averaging pixel data in a power saving mode.

2. Description of the Related Art

Figure 1:
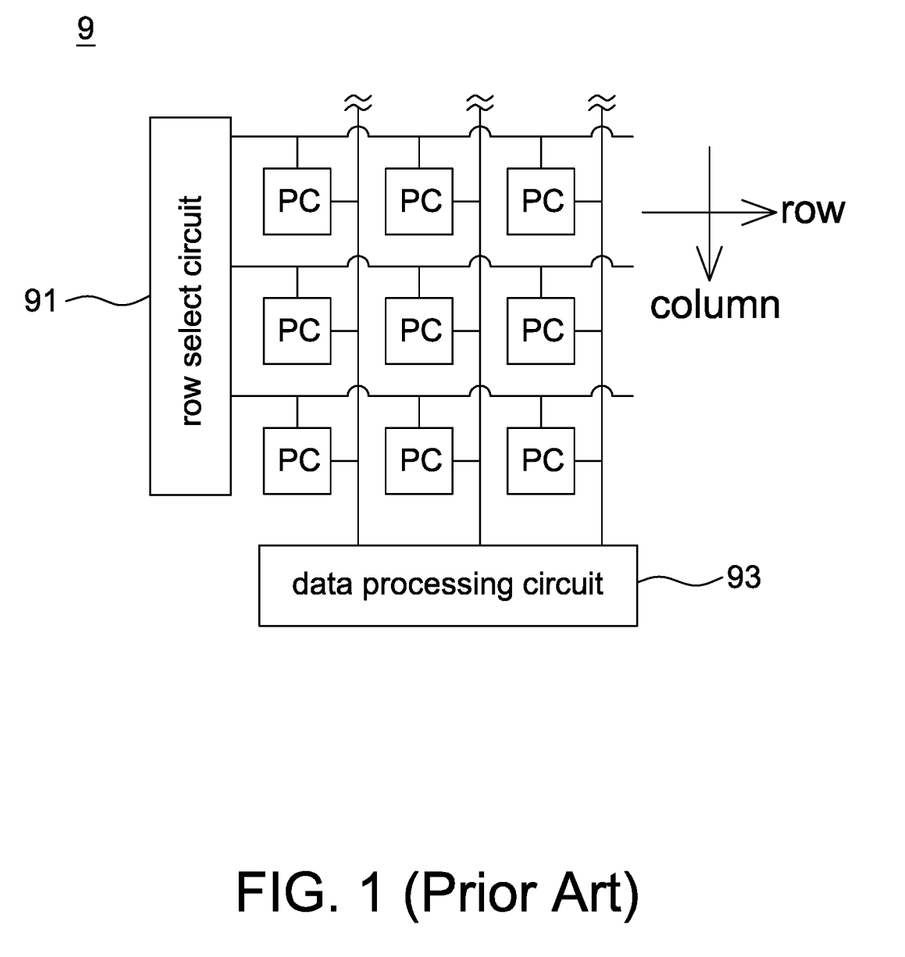
FIG. 1 is a block diagram of a conventional pixel array.

Referring to FIG. 1, it is a block diagram of a conventional pixel array 9. The pixel array 9 includes a row select circuit 91, a data processing circuit 93 and a plurality of pixel circuits PC.

The row select circuit 91 generates a row select signal for sequentially actuating each row of pixel circuits PC. The data processing circuit 93 processes pixel data from the pixel circuits PC in the actuated row.

In some operating conditions, such as a power saving mode, a part of columns of pixel circuits is turned off to save the total power consumption, e.g., the pixel circuits PC in even columns does not sense optical energy. Accordingly, the data processing circuit 93 only processes pixel data of the pixel circuits PC in odd columns. However, although the total power consumption is indeed reduced accordingly, a part of pixel data is ignored.

In addition, the signal-to-noise ratio (SNR) is improved by performing the averaging operation on pixel data. It is known that an average value of the pixel data is calculated in the digital backend. However, this method is not able to reduce the system power consumption.

Accordingly, the present disclosure provides an image sensor capable of reducing the system power consumption and improving the SNR that arranges an average switch, which is switched between a normal mode and a low power mode, between readout lines to realize the averaging of pixel data.

SUMMARY

The present disclosure provides an image sensor that improves the signal-to-noise ratio (SNR) in a low power mode by averaging a part of pixel data, and no pixel data is ignored by using this averaging technique.

The present disclosure further provides an image sensor that turns off a part of components of the readout circuit in an averaging mode to reduce the total power consumption.

The present disclosure further provides an image sensor that reduces power noise in the circuit by arranging dummy pixels in the pixel array.

The present disclosure provides an image sensor including a pixel array, a first readout line, a first readout circuit, a second readout line, a second readout circuit and at least one average switch. The pixel array includes a first pixel circuit and a second pixel circuit arranged in two columns of a plurality of pixel circuit columns of the pixel array. The first readout line is configured to output pixel data of the first pixel circuit. The first readout circuit is configured to read the pixel data of the first pixel circuit via the first readout line. The second readout line is configured to output pixel data of the second pixel circuit. The second readout circuit is configured to read the pixel data of the second pixel circuit via the second readout line. The at least one average switch is coupled between the first readout line and the second readout line. In a first mode, the at least one average switch is not conducted, and the first readout circuit and the second readout circuit are turned on. In a second mode, the at least one average switch is conducted to average the pixel data on the first and second readout lines, and the second readout circuit is turned off.

The present disclosure further provides an image sensor including a pixel array, a first readout line, a first column analog-to-digital converter (CADC), a second readout line, a second column analog-to-digital converter (CADC), a first average switch and a second average switch. The pixel array includes a first pixel circuit and a second pixel circuit arranged in two columns of a plurality of pixel circuit columns of the pixel array. The first readout line is configured to output pixel data of the first pixel circuit. The first CADC includes a first comparator, a first detected signal sample capacitor coupled to one input terminal of the first comparator, and a first reference signal sample capacitor coupled to another input terminal of the first comparator. The second readout line is configured to output pixel data of the second pixel circuit. The second CADC includes a second comparator, a second detected signal sample capacitor coupled to one input terminal of the second comparator, and a second reference signal sample capacitor coupled to another input terminal of the second comparator. The first average switch is coupled between the one input terminal of the first comparator and the one input terminal of the second comparator. The second average switch is coupled between the another input terminal of the first comparator and the another input terminal of the second comparator. In a first mode, the first average switch and the second average switch are not conducted, and the first CADC and the second CADC are turned on. In a second mode, the first average switch and the second average switch are conducted to average the pixel data on the first readout line and the second readout line, and the second CADC is turned off.

The present disclosure further provides an image sensor including a pixel array, a first readout line, a first column analog-to-digital converter (CADC), a second readout line, a second column analog-to-digital converter (CADC), a first storing circuit, a second storing circuit, a first bypass path, a second bypass path and at least one average switch. The pixel array includes a first pixel circuit and a second pixel circuit arranged in two columns of a plurality of pixel circuit columns of the pixel array. The first readout line is configured to output pixel data of the first pixel circuit. The second readout line is configured to output pixel data of the second pixel circuit. The first storing circuit is coupled between the first readout line and the first CADC, and configured to store the pixel data of the first pixel circuit. The second storing circuit is coupled between the second readout line and the second CADC, and configured to store the pixel data of the second pixel circuit. The first bypass path is configured to bypass the first storing circuit. The second bypass path is configured to bypass the second storing circuit. The at least one average switch is coupled between the first storing circuit and the second storing circuit. In a first mode, the at least one average switch is not conducted and the first and second bypass paths are conducted, the first CADC is configured to convert the pixel data of the first pixel circuit to digital data, and the second CADC is configured to convert the pixel data of the second pixel circuit to digital data. In a second mode, the at least one average switch is conducted to average the pixel data of the first storing circuit and the second storing circuit, the first and second bypass paths are not conducted and the second CADC is turned off.

In the image sensor of the present disclosure, the pixel data is, for example, a voltage signal which is generated by the optoelectronic component in the pixel circuit by detecting light energy.

In the image sensor of the present disclosure, the two pixel circuits being averaged are preferably two pixel circuits in the same row of adjacent two pixel circuit columns so as to simplify the trace layout. However, it is possible that the two pixel circuits being averaged are two pixel circuits in different rows of two pixel circuit columns not adjacent to each other.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2:
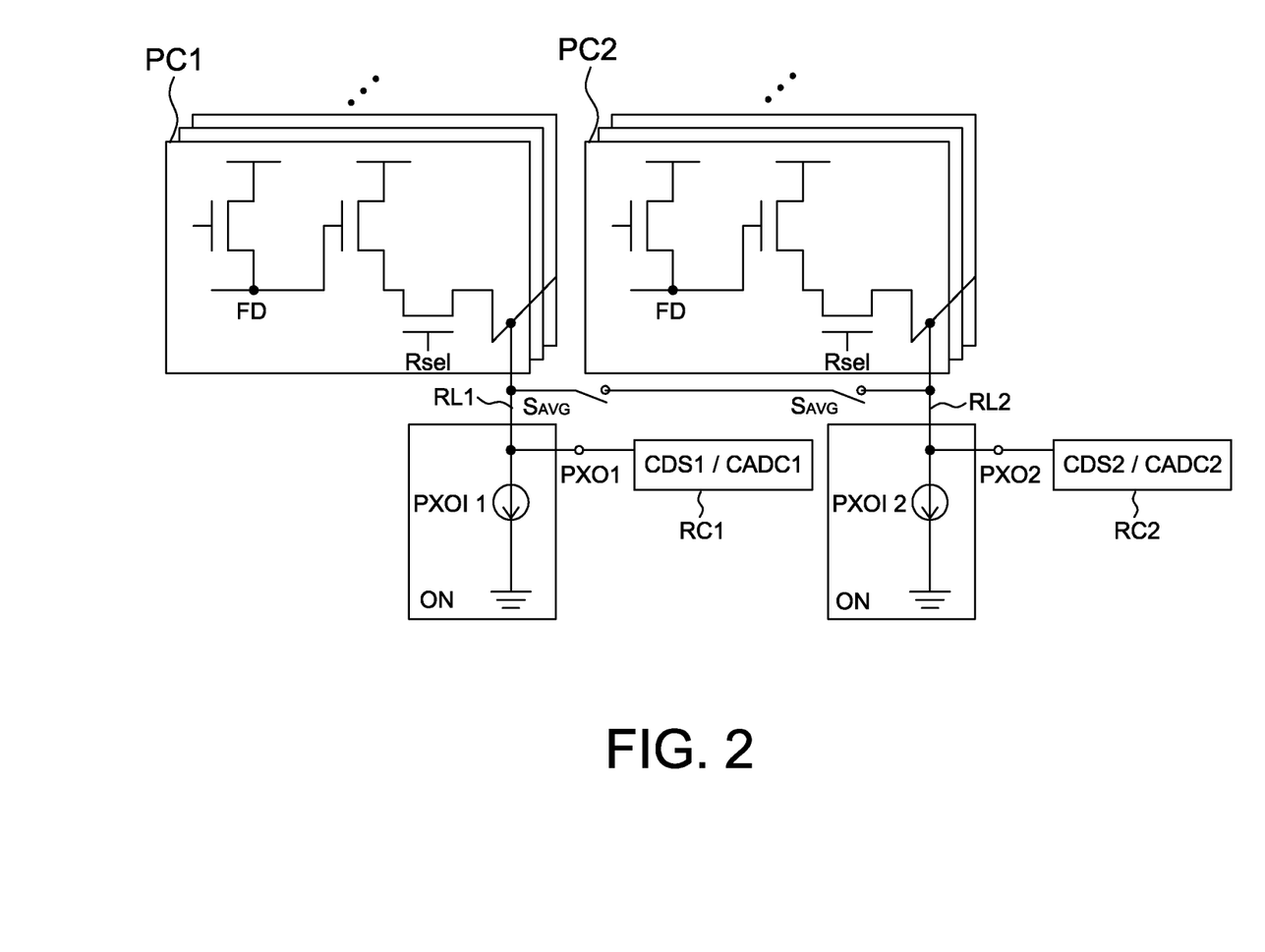
FIG. 2 is an operational schematic diagram of a first mode of an image sensor according to a first embodiment of the present disclosure.
Figure 3:
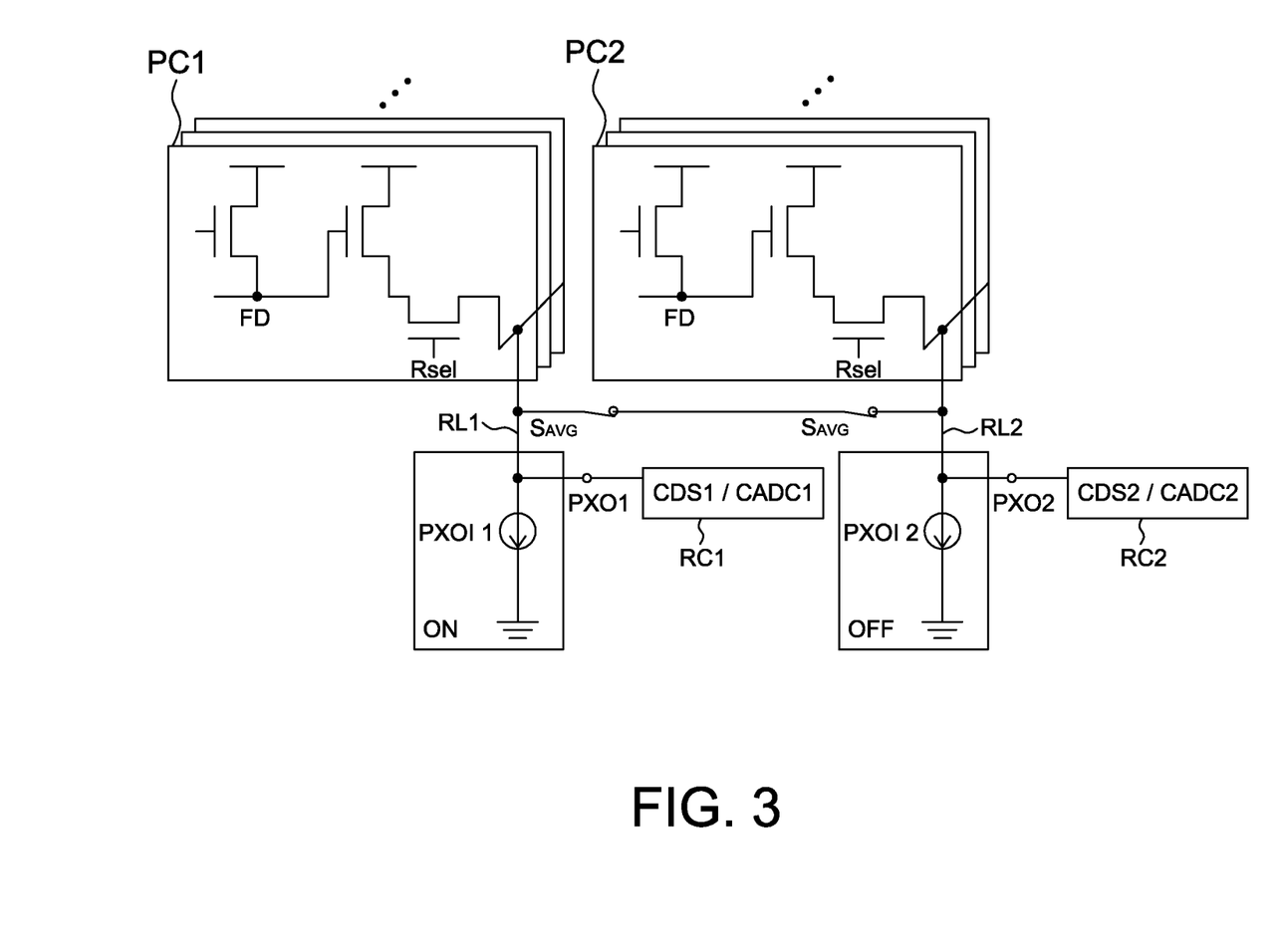
FIG. 3 is an operational schematic diagram of a second mode of an image sensor according to a first embodiment of the present disclosure.

Referring to FIGS. 2 and 3, they are operational schematic diagrams of a first mode and a second mode, respectively, of an image sensor according to a first embodiment of the present disclosure, wherein the first mode is a normal mode such as a photographing mode, an image preview mode or a face recognition mode; the second mode is, for example, a sleep mode or a low power mode. In the second mode, pixel data is averaged by at least one average switch, and a part of components of the readout circuit is shut down.

The image sensor of the present disclosure includes a pixel array, a drive circuit (not shown) and readout circuits. The pixel array of the present disclosure includes a plurality of pixel circuits arranged in a matrix, e.g., arranged as a plurality of pixel circuit columns and a plurality of pixel circuit rows. For example, FIG. 2 shows a first pixel circuit PC1 and a second pixel circuit PC2 in two columns of the plurality of pixel circuit columns of the pixel array. Preferably, the first pixel circuit PC1 and the second pixel circuit PC2 are two pixel circuits in the same row of two adjacent pixel circuit columns, but not limited thereto.

Every pixel circuit of the pixel array of the present disclosure has an identical structure, e.g., three-transistor structures, but not limited thereto. It is possible that the pixel circuits are formed by other conventional structures. The present disclosure is to average pixel data (e.g., raw data) generated by the pixel circuits through the average line and average switch so as to improve the SNR.

As shown in FIGS. 2 and 3, the pixel circuit in every row of a first pixel circuit column (including the first pixel circuit PC1) sequentially outputs pixel data via a first readout line RL1, and the pixel circuit in every row of a second pixel circuit column (including the second pixel circuit PC2) sequentially outputs pixel data via a second readout line RL2. The first readout line RL1 and the second readout line RL2 output charges in the floating diffusion region (FD), for example, when the row select switch Rsel in the associated pixel circuit conducts. The method of generating and outputting pixel data by pixel circuits is known to the art, and thus is not described herein.

The image sensor shown in FIGS. 2 and 3 includes a first readout circuit RC1 used to read the pixel data in the first pixel circuit PC1 via the first readout line RL1, and includes a second readout circuit RC2 used to read the pixel data in the second pixel circuit PC2 via the second readout line RL2, wherein the first readout circuit RC1 and the second readout circuit RC2 respectively include a column analog-to-digital converter (CADC) or a correlated double sampling (CDS) circuit (without a CADC) that connects the first readout line RL1 and the second readout line RL2, respectively.

For example, when the output terminal (e.g., PXO1 and PXO2) of the readout line is directly connected to the CDS circuit, the CDS operation is performed in an analog domain. Whereas, when the output terminal (e.g., PXO1 and PXO2) of the readout line is directly connected to the CADC, the CDS operation is performed in a digital domain behind the analog-to-digital conversion. In the present disclosure, the CDS circuit and the CADC may adopt conventional structures.

The image sensor of the first embodiment further includes at least one average switch (e.g., FIGS. 2 and 3 showing two average switches $S_{AVG}$, but not limited to 2) coupled between the first readout line RL1 and the second readout line RL2, and the at least one average switch $S_{AVG}$ is used to electrically connect pixel circuits in every row of two columns of the plurality of pixel circuit columns in a second mode (e.g., a low power mode) to average pixel data of pixel circuits in every row of the two pixel circuit columns.

For example, in a first mode (e.g., a normal mode) shown in FIG. 2, the average switch $S_{AV}$ is not conducted. The first readout circuit RC1 is turned on to sequentially (e.g., according to a row scan signal) read pixel data generated by each pixel circuit of the whole pixel circuit column that includes the first pixel circuit PC1. The second readout circuit RC2 is turned on to sequentially (e.g., according to the row scan signal) read pixel data generated by each pixel circuit of the whole pixel circuit column that includes the second pixel circuit PC2.

For example, in a second mode shown in FIG. 3, the average switch SAY is conducted to average the pixel data on the first readout line RL1 and on the second readout line RL2. Meanwhile, one of the first readout circuit RC1 and the second readout circuit RC2 is turned off to reduce the power consumption. In other words, when the average switch $S_{AV}$ is conducted, a single readout circuit reads an average of the pixel data generated by two pixel circuit columns.

In some embodiments, the image sensor in FIGS. 2 and 3 further includes a first constant current source PXOI 1 coupled between the first readout line RL1 and ground, and used to form the source follower with a transistor in the first pixel circuit PC1; and the image sensor includes a second constant current source PXOI 2 coupled between the second readout line RL2 and ground, and used to form the source follower with a transistor in the second pixel circuit PC2. Similarly, to reduce the total power consumption, in the second mode one of the first constant current source PXOI 1 and the second constant current source PXOI 2 is turned off. For example, when the first readout circuit RC1 is turned off, the first constant current source PXOI 1 is turned off; whereas, when the second readout circuit RC2 is turned off, the second constant current source PXOI 2 is turned off.

The at least one average switch in FIGS. 2 and 3 is shown to electrically connect at least two columns of the plurality of pixel circuit columns of the pixel array in the second mode to average the pixel data of the at least two pixel circuit columns being electrically connected. In other embodiments, it is possible to further arrange at least one row average switch used to electrically connect at least two rows of the plurality of pixel circuit rows of the pixel array in the second mode to average the pixel data of the at least two pixel circuit rows being electrically connected, and in this case the at least two pixel circuit rows to be averaged have a respective readout line. More specifically, according to different applications, the first embodiment of the present disclosure averages pixel data of at least two adjacent pixel circuit columns, at least two adjacent pixel circuit rows or at least two adjacent pixel circuit columns and rows by arranging at least one average switch $S_{AVG}$ between two readout lines.

It is appreciated that when the image sensor includes more than one average switches $S_{AVG}$ connected between two readout lines, said more than one average switches $S_{AVG}$ are conducted or opened simultaneously. The operation of other two pixel circuit columns is similar to those of FIGS. 2 and 3, and thus details thereof are not repeated herein. One object of arranging more than one average switches $S_{AVG}$ between two readout lines is to improve the effect of electrical isolation.

Figure 4:
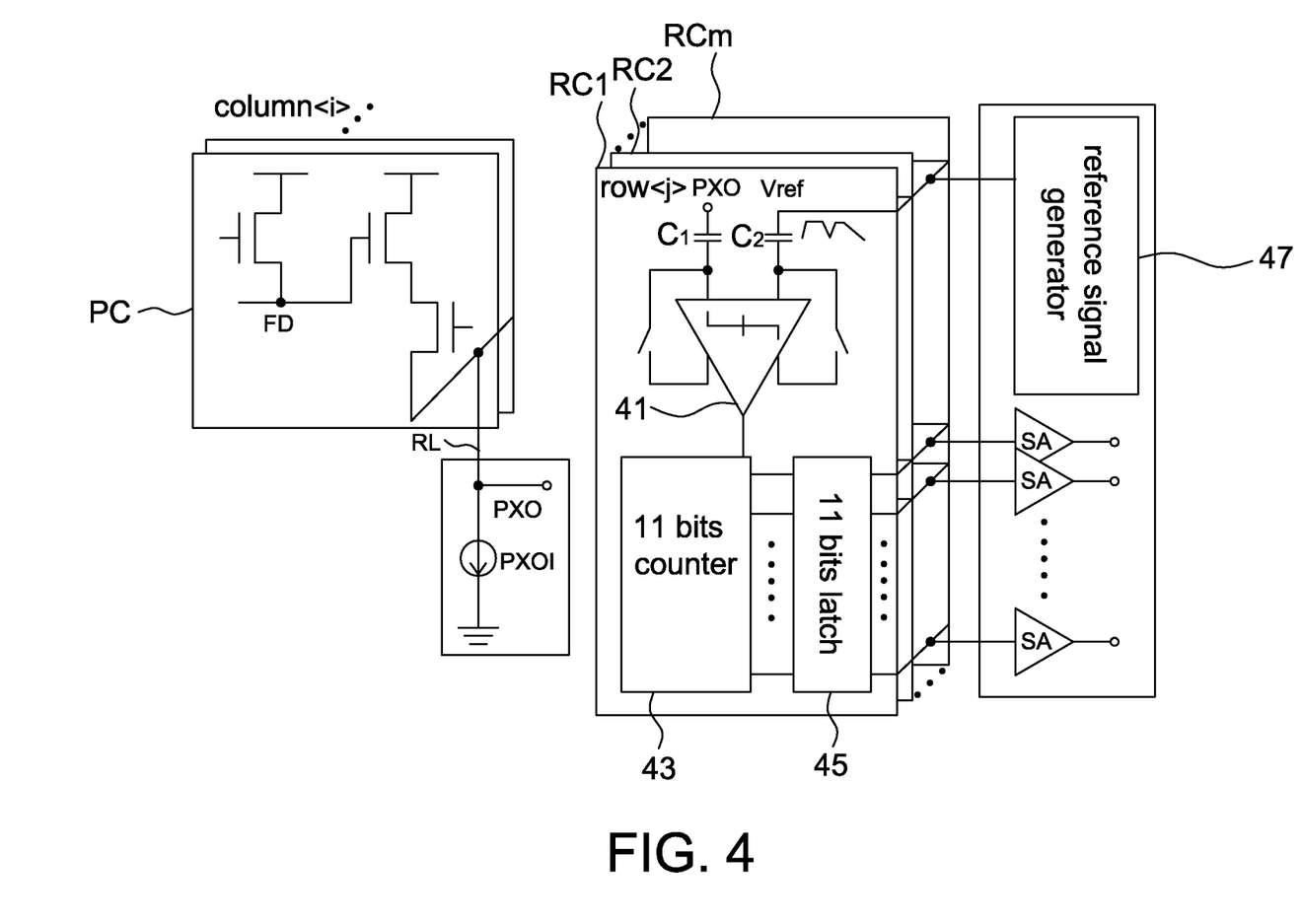
FIG. 4 is a system block diagram of an image sensor according to one embodiment of the present disclosure.

Referring to FIG. 4, it is a system block diagram of an image sensor according to one embodiment of the present disclosure, wherein the readout circuit (e.g., RC1, RC2 . . . RCm) corresponding to every pixel circuit column of the pixel array is shown to include a CADC (or column ADC). A plurality of column ADCs is used to convert raw data of pixel circuits in each row of every pixel circuit column to digital data. The digital data is then, for example, sampled by correlated double sampling technique.

The column ADC includes a comparator 41, a detected signal sample capacitor C1, a reference signal sample capacitor C2, a counter 43, a latch circuit 45 and a reference signal generator 47. The reference signal generator 47 generates a reference signal Vref, e.g., a ramp voltage signal. The reference signal sample capacitor C2 is coupled to one of two input terminals (e.g., non-inverting input) of the comparator 41 for the sampling of the reference signal Vref. The detected signal sample capacitor C1 is coupled to one of two input terminals (e.g., inverting input) of the comparator 41 for the sampling of the pixel data of the associated pixel circuit via the readout line RL, i.e. an output terminal PXO of the pixel circuit being connected to the detected signal sample capacitor C1. The comparator 41 compares the reference signal Vref on the reference signal sample capacitor C2 and the pixel data on the detected signal sample capacitor C1. The counter 43 is used to count till the pixel signal matches the reference signal Vref, and a counting result of the counter 43 is stored in the latch circuit 45. For example, when the pixel circuit PC senses stronger light, the counter 43 counts a larger count number; whereas, when the pixel circuit PC senses weaker light, the counter 43 counts a smaller count number, but not limited to.

When the image sensor of FIG. 4 adopts the averaging technique in the above first embodiment, the at least one average switch $S_{AVG}$ is connected between the detected signal sample capacitor C1 and the readout line RL of the associated pixel circuit PC as shown in FIGS. 2 and 3.

Figure 5:
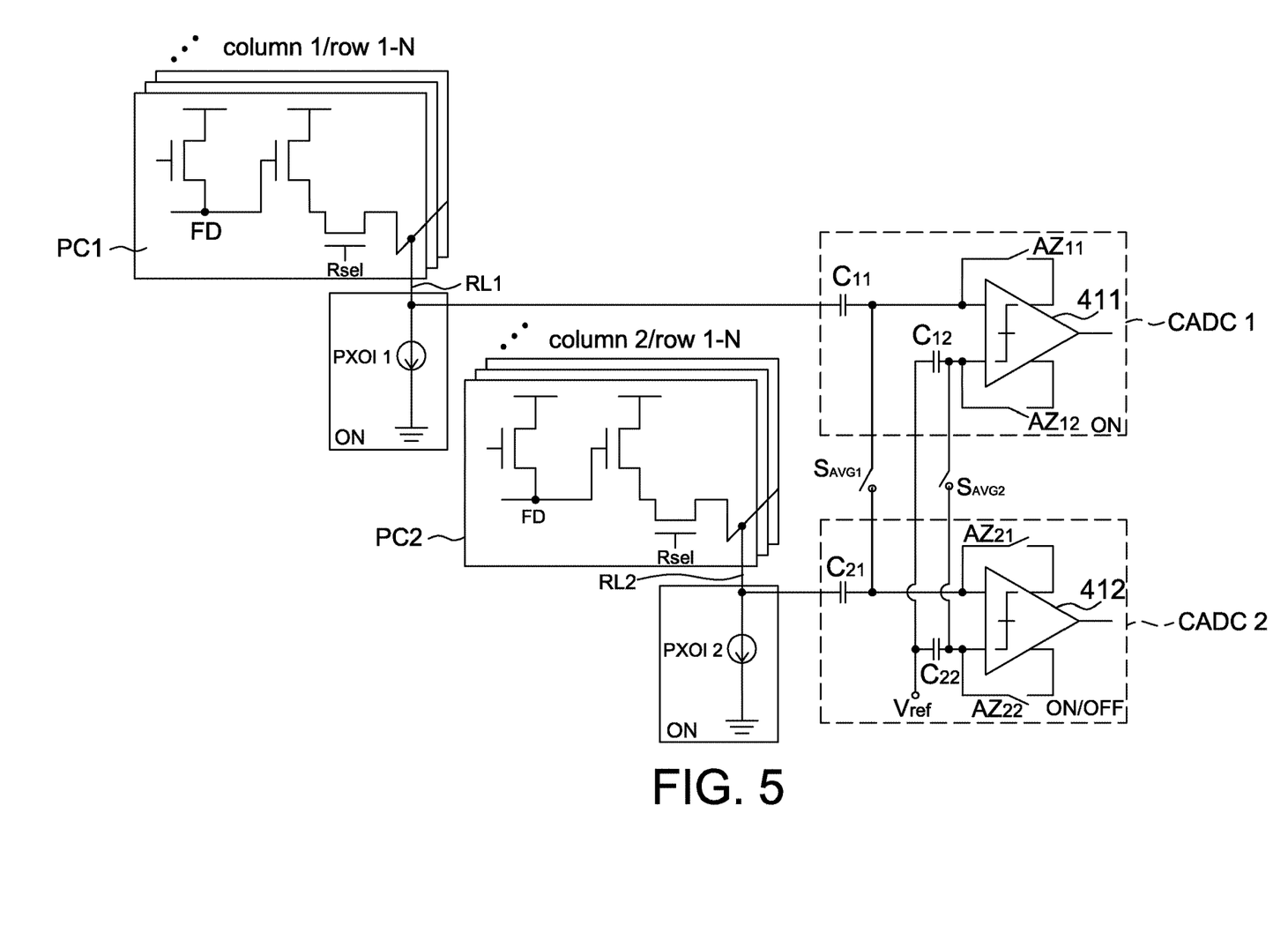
FIG. 5 is a block diagram of an image sensor according to a second embodiment of the present disclosure.

Referring to FIG. 5, it is a block diagram of an image sensor according to a second embodiment of the present disclosure. FIG. 5 also shows two columns of a plurality of pixel circuit columns, and one of ordinary skill in the art would understand the operation of other pixel circuit columns according to the descriptions of the present disclosure. The second embodiment of the present disclosure is adaptable to the readout circuit including the column ADC.

The image sensor in FIG. 5 also includes the first pixel circuit PC1, the second pixel circuit PC2, the first readout line RL1 and the second readout line RL2 as described above, and thus details thereof are not repeated herein. The image sensor of the second embodiment further includes a first column analog-to-digital converter CADC1 connected to all pixel circuits in the same column (e.g., the first column, but not limited to) as the first pixel circuit PC1 via the first readout line RL1, and includes a second column analog-to-digital converter CADC2 connected to all pixel circuits in the same column (e.g., the second column, but not limited to) as the second pixel circuit PC2 via the second readout line RL2.

The CADC1 includes a first comparator 411, a first detected signal sample capacitor $C_{11}$ and a first reference signal sample capacitor $C_{12}$. The first detected signal sample capacitor $C_{11}$ is coupled to one input terminal (e.g., inverting input) of the first comparator 411. When the switch $AZ_{11}$ is conducted, the voltage (i.e. the pixel data) on the first detected signal sample capacitor $C_{11}$ is clamped to an output terminal of the first comparator 411. The first reference signal sample capacitor $C_{12}$ is coupled to another input terminal (e.g., non-inverting input) of the first comparator 411 to receive the reference signal Vref. As mentioned above, the reference signal Vref is a ramp voltage signal outputted by the reference signal generator 47. When the switch $AZ_{12}$ is conducted, the voltage on the first reference signal sample capacitor $C_{12}$ is clamped to the output terminal of the first comparator 411.

The CADC2 includes a second comparator 412, a second detected signal sample capacitor $C_{21}$ and a second reference signal sample capacitor $C_{22}$. The second detected signal sample capacitor $C_{21}$ is coupled to one input terminal (e.g., inverting input) of the second comparator 412. When the switch $AZ_{21}$ is conducted, the voltage (i.e. the pixel data) on the second detected signal sample capacitor $C_{21}$ is clamped to an output terminal of the second comparator 412. The second reference signal sample capacitor $C_{22}$ is coupled to another input terminal (e.g., non-inverting input) of the second comparator 412 to receive the reference signal Vref. Similarly, the reference signal Vref is a ramp voltage signal outputted by the reference signal generator 47. When the switch $AZ_{22}$ is conducted, the voltage on the second reference signal sample capacitor $C_{22}$ is clamped to the output terminal of the second comparator 412.

To average the pixel data on two pixel circuit columns, the image sensor of the second embodiment further includes the average switch. One example is implemented as the first embodiment, the average switch $S_{AVG}$ is connected between the first readout line RL1 and the second readout line RL2, and external to the CADC1 and CADC2, i.e. between the detected signal sample capacitor $C_{11}$, $C_{12}$ and the associated pixel circuit PC1, PC2.

Another example is implemented as FIG. 5 in which a first average switch $S_{AVG1}$ is coupled between one input terminal of the first comparator 411 and one input terminal of the second comparator 412. More specifically, a first end of the first average switch $S_{AVG1}$ is connected between the first detected signal sample capacitor $C_{11}$ and the one input terminal of the first comparator 411, and a second end of the first average switch $S_{AVG1}$ is connected between the second detected signal sample capacitor $C_{21}$ and the one input terminal of the second comparator 412.

A second average switch $S_{AVG2}$ is coupled between another input terminal of the first comparator 411 and another input terminal of the second comparator 412. More specifically, a first end of the second average switch $S_{AVG2}$ is connected between the first reference signal sample capacitor $C_{12}$ and the another input terminal of the first comparator 411, and a second end of the second average switch $S_{AVG2}$ is connected between the second reference signal sample capacitor $C_{22}$ and the another input terminal of the second comparator 412.

Accordingly, in a first mode, the first average switch $S_{AVG1}$ and the second average switch $S_{AVG2}$ are not conducted. The CADC1 is turned on to sequentially (e.g., according to a row scan signal) convert, via the first readout line RL1, pixel data of the first pixel circuit PC1 and other pixel circuits in the same column to digital data. The CADC2 is turned on to sequentially (e.g., according to a row scan signal) convert, via the second readout line RL2, pixel data of the second pixel circuit PC2 and other pixel circuits in the same column to digital data.

In a second mode, the first average switch $S_{AVG1}$ and the second average switch $S_{AVG2}$ are conducted to average pixel data on the first readout line RL1 and pixel data on the second readout line RL2. Meanwhile, to reduce the total power consumption, after the first average switch $S_{AVG1}$ and the second average switch $S_{AVG2}$ are conducted, one of the CADC1 and CADC2 is turned off. More specifically, only one of the CADC1 and CADC2 is turned on to convert the averaged pixel data (e.g., averaging by conducting the first and second average switches) of pixel circuits of every row of two columns among the plurality of pixel circuit columns. When $C_{11}=C_{21}$ and $C_{12}=C_{22}$, the activated CADC is used to perform the analog-to-digital conversion on a summation of a half pixel data of the first pixel circuit PC1 and a half pixel data of the second pixel circuit PC2.

The image sensor of FIG. 5 also includes a first constant current source PXOI 1 coupled between the first readout line RL1 and ground, and includes a second constant current source PXOI 2 coupled between the second readout line RL2 and ground. As mentioned above, the first constant current source PXOI 1 and the second constant current source PXOI 2 are used to form the source follower. However, in the second embodiment, the first constant current source PXOI 1 and the second constant current source PXOI 2 are turned on continuously without being turned off in the second mode.

Figure 6:
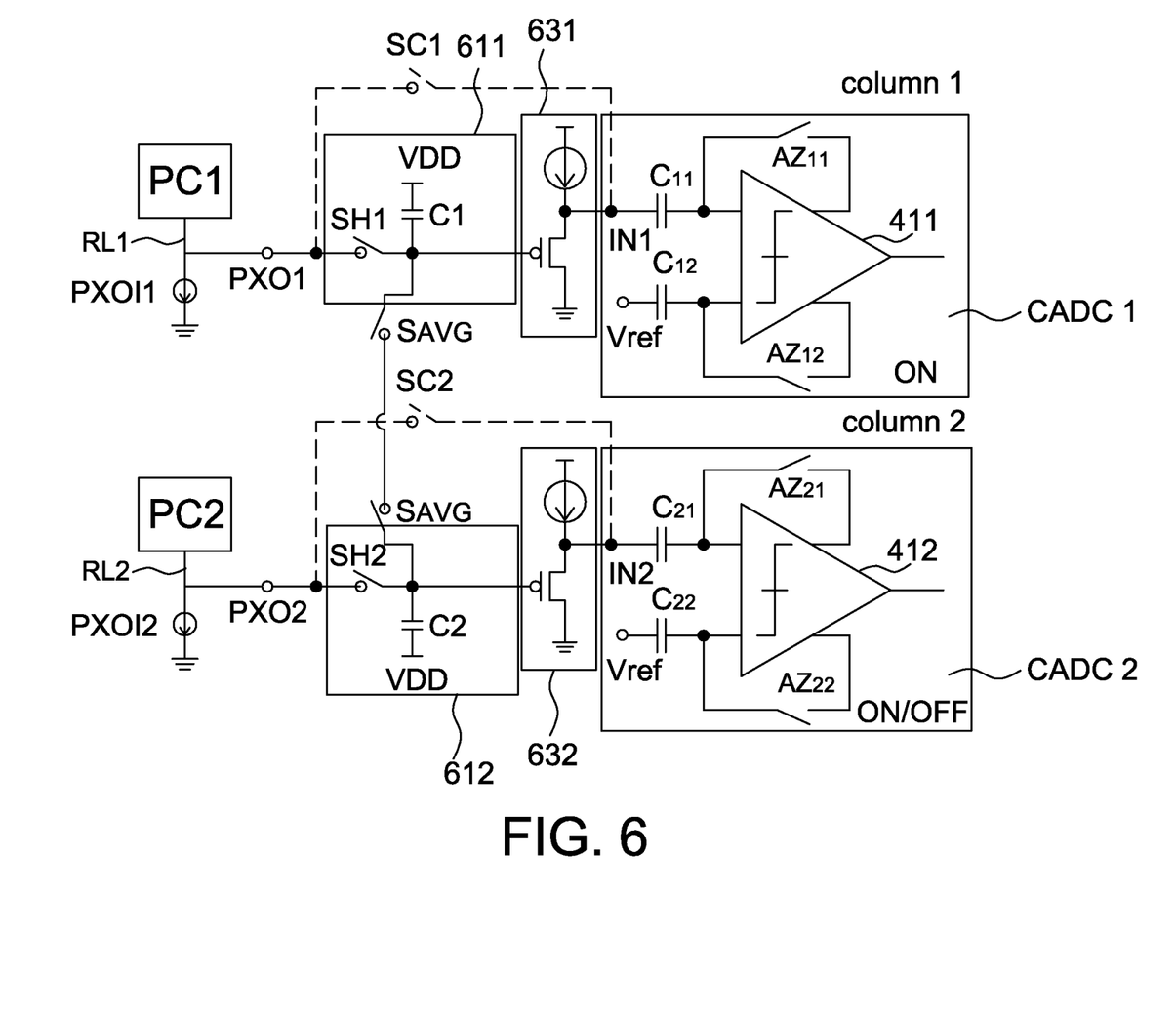
FIG. 6 is a block diagram of an image sensor according to a third embodiment of the present disclosure.

Please referring the FIG. 6, it is a block diagram of an image sensor according to a third embodiment of the present disclosure. The image sensor of the third embodiment also includes a first pixel circuit PC1 (also being one pixel circuit in one column of a plurality of pixel circuit columns of the pixel array), a second pixel circuit PC2 (also being one pixel circuit in one column of a plurality of pixel circuit columns of the pixel array), a first readout line RL1, a second readout line RL2, a first constant current source PXOI 1, a second constant current source PXOI 2, a first column analog-to-digital converter CADC1 and a second column analog-to-digital converter CADC2, wherein these components are identical to those of the first and second embodiments and thus details thereof are not repeated herein.

The image sensor of the third embodiment further includes a first storing circuit 611, a second storing circuit 612, a first voltage buffer 631 and a second voltage buffer 632. The first storing circuit 611 is coupled between the first readout line RL1 (e.g., output terminal PXO1) and the CADC1 (e.g., node IN1), and used to store pixel data of the first pixel circuit PC1 before the averaging. The second storing circuit 612 is coupled between the second readout line RL2 (e.g., output terminal PXO2) and the CADC2 (e.g., node IN2), and used to store pixel data of the second pixel circuit PC2 before the averaging.

The first voltage buffer 631 is coupled between the first storing circuit 611 and the CADC1 for nondestructively buffer the voltage (i.e. pixel data) stored in the first storing circuit 611 to the first detected signal sample capacitor $C_{11}$. The second voltage buffer 632 is coupled between the second storing circuit 612 and the CADC2 for nondestructively buffer the voltage (i.e. pixel data) stored in the second storing circuit 612 to the second detected signal sample capacitor C21.

In some embodiments, the first storing circuit 611 includes a first storage capacitor C1 used to store the pixel data of the first pixel circuit PC1 and a first sample switch SH1 used to control the pixel data of the first pixel circuit PC1 to be stored into the first storage capacitor C1. The first sample switch SH1 is connected to a first end of the first storage capacitor C1, and a second end of the first storage capacitor C1 is coupled to a voltage source VDD. The second storing circuit 612 includes a second storage capacitor C2 used to store the pixel data of the second pixel circuit PC2 and a second sample switch SH2 used to control the pixel data of the second pixel circuit PC2 to be stored into the second storage capacitor C2. The second sample switch SH2 is connected to a first end of the second storage capacitor C2, and a second end of the second storage capacitor C2 is coupled to the voltage source VDD.

It should be mentioned that the first storing circuit 611 and the second storing circuit 612 are not limited to those shown in FIG. 6 but have other electrical structure as long as they include a capacitor for temporarily storing the pixel data and a switch for controlling the storing of the pixel data.

The image sensor of the third embodiment further includes a first bypass path (shown as the dashed line) used to bypass the first storing circuit 611. The first bypass path includes a first bypass switch SC1 whose first end is connected between the first detected signal sample capacitor $C_{11}$ of the CADC1 and the first storing circuit 611 (e.g., at a node IN1), and a second end thereof is connected between the first storing circuit 611 and the first pixel circuit PC1 (e.g., at output terminal PXO1). When the image sensor further includes the first voltage buffer 631, one end of the first bypass path is connected between the first detected signal sample capacitor $C_{11}$ and the first voltage buffer 631. When the first bypass path SC1 is conducted, the pixel data of the first pixel circuit PC1 is directly coupled to the first detected signal sample capacitor $C_{11}$ via the first bypass path.

The image sensor of the third embodiment further includes a second bypass path (shown as the dashed line) used to bypass the second storing circuit 612. The second bypass path includes a second bypass switch SC2 whose first end is connected between the second detected signal sample capacitor $C_{21}$ of the CADC2 and the second storing circuit 612 (e.g., at a node IN2), and a second end thereof is connected between the second storing circuit 612 and the second pixel circuit PC2 (e.g., at output terminal PXO2). When the image sensor further includes the second voltage buffer 632, one end of the second bypass path is connected between the second detected signal sample capacitor C21 and the second voltage buffer 632. When the second bypass path SC2 is conducted, the pixel data of the second pixel circuit PC2 is directly coupled to the second detected signal sample capacitor $C_{21}$ via the second bypass path.

The image sensor of the third embodiment further includes at least one average switch $S_{AVG}$ (FIG. 6 showing two average switches $S_{AVG}$, but not limited to 2) coupled between the first storing circuit 611 and the second storing circuit 612, e.g., between the detected signal sample capacitor (e.g. $C_{11}$, $C_{12}$) and the associated pixel circuit (e.g., PC1, PC2). FIG. 6 shows that the at least one average switch SANG is coupled to a first end of the first storage capacitor C1 and a first end of the second storage capacitor C2. Using more than one average switches is also to improve the electrical isolation.

In a first mode, the at least one average switch $S_{AVG}$ is not conducted, and the first bypass path (or the first bypass switch SC1) and the second bypass path (or the second bypass switch SC2) are conducted to respectively bypass the first storing circuit 611 and the second storing circuit 612. The CADC1 is used to sequentially (e.g., according to a row scan signal) convert pixel data of the first pixel circuit PC1 and other pixel circuits in the same column to digital data via the first readout line RL1 and the first bypass path. The CADC2 is used to sequentially (e.g., according to a row scan signal) convert pixel data of the second pixel circuit PC2 and other pixel circuits in the same column to digital data via the second readout line RL2 and the second bypass path.

In a second mode, the first bypass path and the second bypass path are not conducted (e.g., opening the first bypass switch SC1 and the second bypass switch SC2). The at least one average switch $S_{AVG}$ is conducted to average the pixel data stored in the first storing circuit 611 (more specifically in the first storage capacitor C1) and the second storing circuit 612 (more specifically in the second storage capacitor C2). After entering the second mode, the first sample switch SH1 and the second sample switch SH2 are conducted (e.g., corresponding to a row scan signal) at first to respectively store the pixel data of the first pixel circuit PC1 and the pixel data of the second pixel circuit PC2 into the first storage capacitor C1 and the second storage capacitor C2 via the first readout line RL1 and the second readout line RL2. Next, the first sample switch SH1 and the second switch SH2 are opened, and the at least one average switch $S_{AVG}$ is conducted after the first sample switch SH1 and the second sample switch SH2 are opened to average voltages temporarily stored in the first storage capacitor C1 and the second storage capacitor C2.

To reduce the power consumption, in the second mode one of the CADC1 (and the first voltage buffer 631) and the CADC2 (and the second voltage buffer 632) is turned off. More specifically, only one of the CADC1 and CADC2 is used to convert the averaged pixel data (e.g., the average voltage of the first storage capacitor C1 and the second storage capacitor C2 obtained by conducting the at least one average switch $S_{AVG}$) of pixel circuits of every row of two columns of a plurality of pixel circuit columns to digital data.

Figure 7:
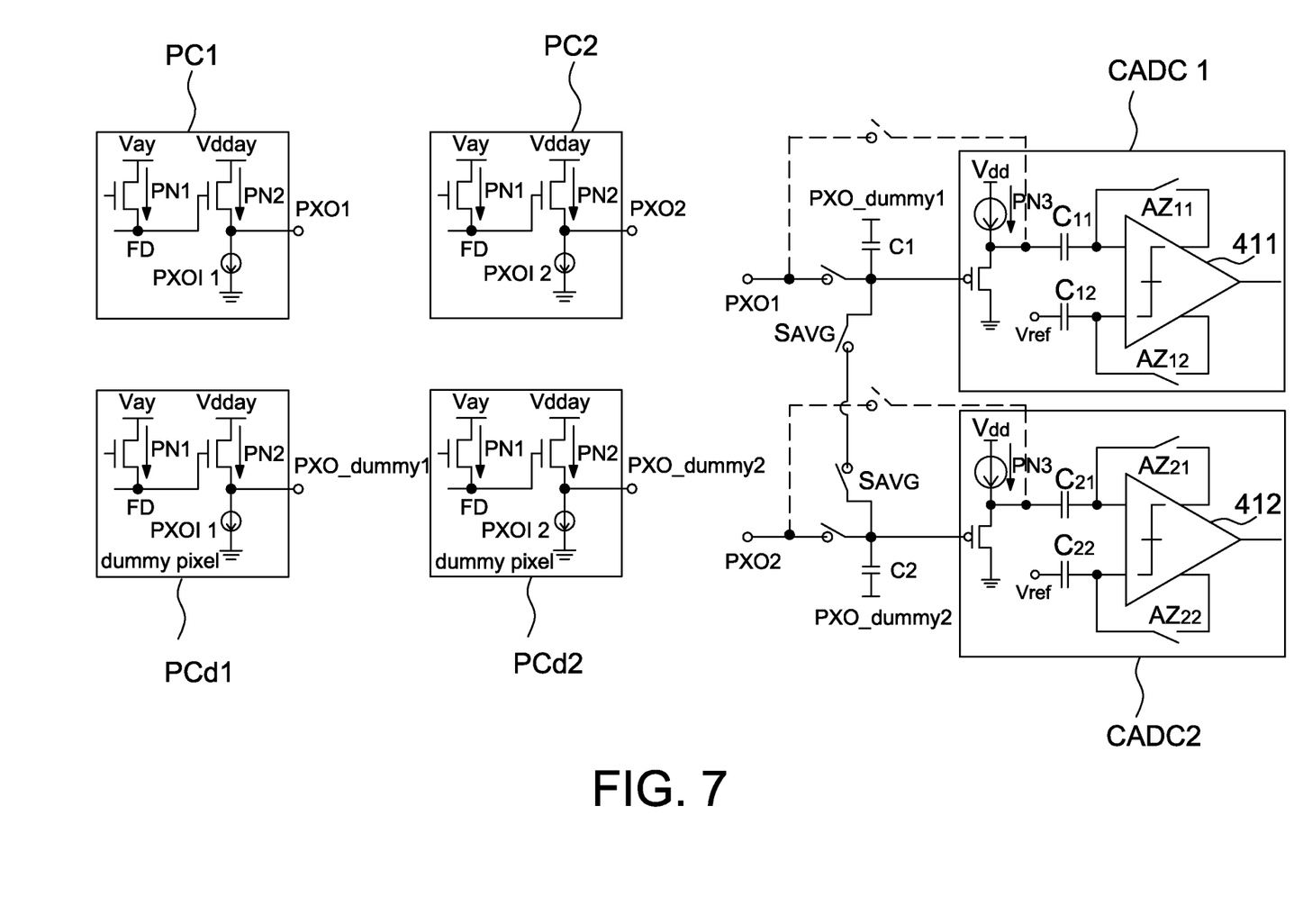
FIG. 7 is another block diagram of an image sensor according to a third embodiment of the present disclosure.

In another aspect of the third embodiment, the pixel circuit further includes a plurality of dummy pixel circuits respectively arranged corresponding to the plurality of pixel circuit columns, e.g., the first or last pixel circuit of one pixel circuit column is the dummy pixel circuit.

For example, FIG. 7 shows that the pixel array includes a first dummy pixel circuit PCd1 corresponding to one pixel circuit column which includes the first pixel circuit PC1, and includes a second dummy pixel circuit PCd2 corresponding to one pixel circuit column which includes the second pixel circuit PC2. The first pixel circuit PC1 and the first dummy pixel circuit PCd1 have identical circuit parameters, e.g., connecting to identical voltage sources Vay, Vday and having identical current sources PXOI 1 to form identical current PN1 and PN2 such that identical power noise is generated. The first dummy pixel circuit PCd1 does not sense optical energy, e.g., covered by an opaque layer. The second pixel circuit PC2 and the second dummy pixel circuit PCd2 have identical circuit parameters, e.g., connecting to identical voltage sources Vay, Vday and having identical current sources PXOI 2 to form identical current PN1 and PN2 such that identical power noise is generated. The second dummy pixel circuit PCd2 does not sense optical energy, e.g., covered by an opaque layer.

The first dummy pixel circuit PCd1 is used to output a first dummy pixel data PXO_dummy1 to the second end of the first storage capacitor C1 to cancel out the power noise at the pixel output terminal PXO1 in the second mode. The second dummy pixel circuit PCd2 is used to output a second dummy pixel data PXO_dummy2 to the second end of the second storage capacitor C2 to cancel out the power noise at the pixel output terminal PXO2 in the second mode.

In addition, to allow the first comparator 411 and the second comparator 412 have identical comparing basis, the voltage signal generated by the reference signal generator 47 is preferably passed through a buffer circuit as the first voltage buffer 631 and the second voltage buffer 632 and then inputted to the first reference signal sample capacitor Cu and the second reference signal sample capacitor $C_{22}$.

Figure 8:
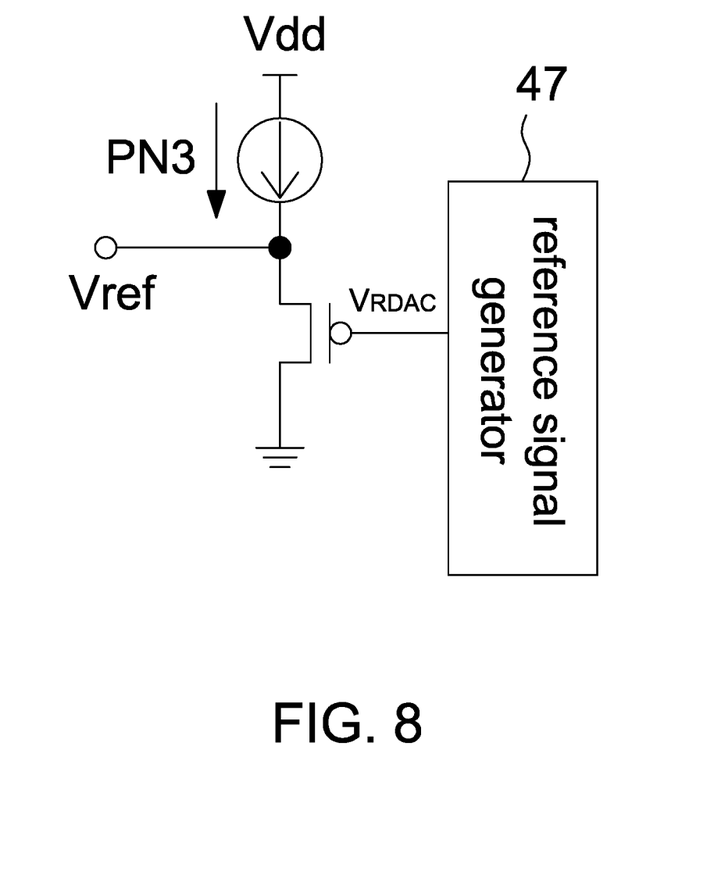
FIG. 8 is a schematic diagram of a voltage buffer coupled to a reference signal generator in an image sensor according to a third embodiment of the present disclosure.

For example referring to FIG. 8, it is a schematic diagram of a voltage buffer coupled to a reference signal generator 47 in an image sensor according to a third embodiment of the present disclosure. A voltage signal $V_{RDAC}$ generated by the reference signal generator 47 is buffer as the reference voltage Vref to be inputted into the first reference signal sample capacitor Cu and the second reference signal sample capacitor $C_{22}$ after passing a voltage buffer. The circuit parameter of said voltage buffer is identical to those of the first voltage buffer 631 and the second voltage buffer 632, e.g., having identical voltage source Vdd and current source PN3.

The switching components in the above embodiments (e.g., the average switch, the bypass switch and $AZ_{11}$-$AZ_{22}$) are controlled by a processing unit of the image sensor. The processing unit is, for example, a digital signal processor (DSP), a central processing unit (CPU), a microcontroller unit (MCU) or an application specific integrated circuit (ASIC).

It should be mentioned that the values in the above embodiments, e.g., a number of components and bit number, are only intended to illustrate but not to limit the present disclosure.

As mentioned above, the conventional pixel readout circuit of an image sensor has the issues of losing pixel data and unable to reduce the total power consumption. Therefore, the present disclosure further provides an image sensor (as shown in FIGS. 2 to 3 and FIGS. 5 to 7) that averages pixel data by disposing an average switch between two columns/rows of pixel circuits and has the benefit of losing no pixel data. In addition, in the power saving mode, the image sensor of the present disclosure turns off a part of readout circuit to reduce the total power consumption.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An image sensor, comprising:
   a pixel array comprising a first pixel circuit and a second pixel circuit arranged in two columns of a plurality of pixel circuit columns of the pixel array;
   a first readout line configured to output pixel data of the first pixel circuit;
   a first readout circuit configured to read the pixel data of the first pixel circuit via the first readout line;
   a second readout line configured to output pixel data of the second pixel circuit;
   a second readout circuit different from the first readout circuit, and configured to read the pixel data of the second pixel circuit via the second readout line; and
   at least one average switch coupled between the first readout line and the second readout line, wherein
   in a first mode, the at least one average switch is not conducted, and the first readout circuit and the second readout circuit are both turned on, and
   in a second mode, the at least one average switch is conducted to average the pixel data on the first and second readout lines, and the first readout circuit is turned on but the second readout circuit is turned off.

2. The image sensor as claimed in claim 1, further comprising:
   a first constant current source coupled between the first readout line and ground; and
   a second constant current source coupled between the second readout line and the ground,
   wherein the second constant current source is turned off in the second mode.

3. The image sensor as claimed in claim 1, further comprising at least one row average switch configured to electrically connect, in the second mode, two pixel circuit rows of a plurality of pixel circuit rows of the pixel array to average pixel data of the two pixel circuit rows.

4. The image sensor as claimed in claim 1, wherein pixel circuits in all rows of the two columns of the plurality of pixel circuit columns are electrically connected, in the second mode, via the at least one average switch to average pixel data of the pixel circuits in all rows of the two pixel circuit columns.

5. The image sensor as claimed in claim 1, wherein
   the first readout circuit includes a first correlated double sampling circuit connected to the first readout line, and
   the second readout circuit includes a second correlated double sampling circuit different from the first correlated double sampling circuit, and connected to the second readout line.

6. The image sensor as claimed in claim 1, wherein
   each of the first readout circuit and the second readout circuit comprises a column analog-to-digital converter (CADC) connected to the associated first or second readout line,
   the CADC comprises a comparator and a detected signal sample capacitor coupled to one input terminal of the comparator, and
   the at least one average switch is connected between the detected signal sample capacitor and the associated first or second pixel circuit.

7. The image sensor as claimed in claim 6, wherein another input terminal of the comparator is configured to receive a ramp voltage.

8. The image sensor as claimed in claim 1, wherein
   the first mode is a photographing mode, an image preview mode or a face recognition mode, and
   the second mode is a sleep mode or a low power mode.

9. The image sensor as claimed in claim 1, wherein the at least one average switch comprises two average switches cascadedly connected via an average line between the first readout line and the second readout line.

10. The image sensor as claimed in claim 9, wherein a section of the average line between the two cascadedly connected average switches is not connected to any other circuit of the image sensor.

* * * * *